July 19, 1966 R. H. PINKERTON 3,261,254

TAMPER-PROOF FASTENER

Filed Oct. 16, 1963

INVENTOR.
Robert H. Pinkerton
BY
Dale A. Winnie
ATTORNEY

_United States Patent Office_

3,261,254
Patented July 19, 1966

3,261,254
TAMPER-PROOF FASTENER
Robert H. Pinkerton, 507 Woodcrest Drive,
Royal Oak, Mich.
Filed Oct. 16, 1963, Ser. No. 316,736
3 Claims. (Cl. 85—9)

This invention relates to tamper-proof fasteners in general and more particularly to means of modifying commonly known removable fasteners, such as nut, bolt and screw fasteners, to preclude the loss of parts retained thereby.

Innumerable products are required to have certain parts which are readily removable for service, repair or replacement. Accordingly, commonly known removable fasteners such as screws and nuts and bolts or the like are used to fasten the part to the major component.

Unfortunately, while this proves to be an advantage to the ultimate consumer and to service personnel, in most instances, it is the cause of petty thefts of considerable dollar volume to merchants required to keep their products on public display. The ease with which a component part may be removed enables a thief to steal the part with little or no effort and so quickly that the chance of being caught is considerably minimized.

A prime example of the merchant that suffers from such thefts and pilfering is the new and used car dealer.

Automobiles dealers must keep their cars on display twenty-four hours a day and they must also keep a stock of cars on hand; usually in unprotected storage lots. The automobile itself can be locked up and the ignition key removed. However, hub caps, storage batteries, tires and wheels are normally left on the car and these are the very items that the manufacturer makes easily removable for service and repair.

Although storage batteries and hub caps can be removed from cars in storage, and usually are, the wheels must remain on the car to enable it to be moved from one location to another and to otherwise be ready for taking a customer on a demonstration ride.

Insurance companies are so conscious of the heavy losses on wheels and tires that they usually exclude such losses in insurance policies or require much higher premiums for low deductible policies to cover these items.

Numerous different solutions have been offered to this specific problem in the form of special wheel nuts with regular key locks, or otherwise made theft proof, but the expense per automobile is seldom justified. The thefts are not by professionals in most instances are are seldom with any predictable regularity. It is usually a group of youngsters on a lark, needing a tire for their car or hoping to sell the tire for some pocket money.

No device can be truly said to prevent thefts but what is seriously needed by car dealers, and others in like circumstances, is an inexpensive tamper-proof device which will discourage the general run of the mill thefts which occur when it's too easy to steal an item.

With this in mind, it is an object of this invention to provide a tamper-proof fastener for retail merchants of the type mentioned, and others, which will discourage petty thefts without changing the readily removable characteristic of the fastener for those that make use of it.

It is an object of this invention to teach means of changing commonly known fasteners so that they are tamper proof without having it to be apparent that the fastener has been altered. In this way, one of several fasteners may be made tamper proof, without all being changed, and only the merchant knows which fastener requires special attention.

It is an object of this invention to provide a simple and expedient means of modifying commonly known fasteners to make them tamper proof in order that cost will be minimized and merchants will be encouraged to make use of such fasteners.

It is an object of this invention to teach certain modifications in the tamper-proof fastener taught to enable innumerable combinations, usable by different merchants and at different times, to preclude the use of a special tool by would-be theives acquainted with the fastener means used.

To be more specific, it is an object of this invention to provide a common fastener with a rotatable head, which will spin free once the fastener is installed, and which is not readily distinguishable from other standard fasteners of like kind.

The fastener contemplated includes a special shearproof key receptive in co-operatively disposed slots in the body of the fastener and in the rotatable head so that the two can be locked together, for installation or removal of the fastener, and can be removed as desired.

Differently shaped keys and key slots may be provided on similar or different type fasteners and may be made available to merchants dealing in the same or different products to further discourage thefts. Such modifications in the keys and key slots may be readily made by the manufacturer.

The key slot arrangement proposed is further tamper proof in requiring a key of special tool-hardened material and being such that will normally shear other materials tried for like purpose.

These and other objects and advantages to be gained in the practice of this invention will be more fully understood and better appreciated upon a reading of the following specification which has reference to the accompanying drawings.

Figure 1:
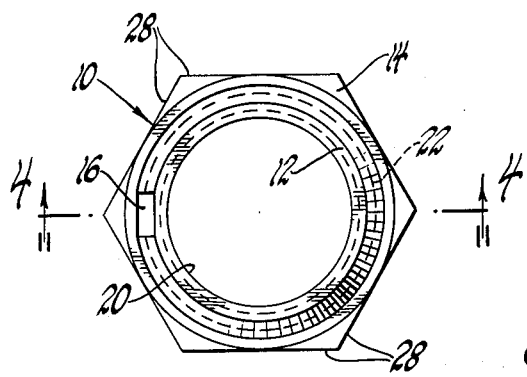
FIGURE 1 is a plan view of a hex-head nut modified to include the features of this invention.
Figure 2:
FIGURE 2 is a side plan view of the key used with the nut fastener shown by the first drawing figure.
Figure 3:
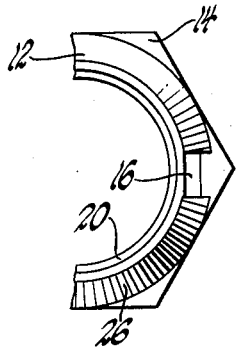
FIGURE 3 is a bottom plan view of a fragmentary part of the fastener shown in the first drawing figure.
Figure 4:
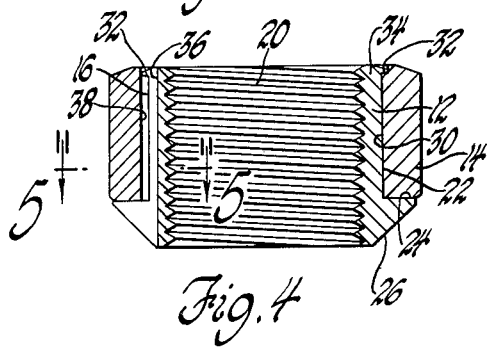
FIGURE 4 is a cross-sectional view of the fastener shown in the first drawing figure as seen in the plane of line 4—4 thereon.

A nut type tamper-proof fastener 10 is shown in the drawing FIGURES 1–6. This fastener includes a threaded nut portion 12 having a hex-head collar member 14 provided circumferentially therearound and with a key slot 16 co-operatively formed in the two parts and receptive of a key member 18 therewithin to lock the two parts together.

The nut portion 12 includes an internally threaded bore 20 and is formed to provide an outer plane surfaced cylindrical body portion 22. An annular shoulder 24 is provided at one end of the cylindrical body portion 22. The shoulder 24 is tapered towards the terminal end of the nut part to provide a cone 26.

The collar member 14, as mentioned, is formed to include external hexagonal side walls 28. It is provided with a plane surfaced bore 30 having an internal diameter receptive of the outer cylindrical body portion 22 of the nut part 12 in close fitted relation therein and such that the two parts are rotatable relative of each other.

The collar member 14 is received on the nut portion 12 and in shoulder stopped engagement with the annular shoulder 24 provided on the nut. The collar member 14 is provided with a shoulder ledge 22 which is receptive of the upper disposed edge 34 of the nut which is rolled into engagement therewith. Accordingly, the collar 14 is retained in relatively rotatable engagement on the threaded part 12 and, at the same time, is precluded from axial disengagement therefrom by the shoulder 24 and the rolled edge 34.

The key slot 16 includes a slot 36 which is formed in the threaded nut part 12 and extends the full length thereof, including through the shoulder 24. The other part 38 of the key slot 16 is formed in the collar member and similarly extends the full length thereof.

The key 18 is made of hardened tool steel and includes a straight leg 40 of slightly longer length, though not necessarily, than an angular leg 42 provided at the opposite end thereof. The straight leg portion 40 is adapted to be received in the key slot 16 and the angular leg 42 is such as extends radially over the nut portion 12.

In the embodiment just disclosed it will be appreciated that when the key 18 is in the key slot 16 the nut and collar member 12 and 14 are locked against relative rotation. Accordingly, when the key is in use a wrench or hex-head tool may be applied to the collar 14 to turn the threaded nut onto a receptive stud. The tool hardened key enables the nut to be tightened as required and will not shear under normal torque conditions.

The angular leg 42 of the key 18 extends inwardly of the collar 14 and accordingly will not interfere with the normal cup shaped hex-head tire changing tool. It also stands sufficiently over the threaded part of the nut to enable a threaded stud to extend a reasonable distance therethrough.

Figure 5:
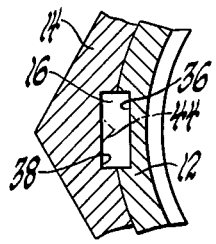
FIGURE 5 is an enlarged cross-sectional view of a fragmentary part of the fastener shown in the last mentioned drawing figure as seen in the plane of line 5—5 thereon.

FIGURE 5 shows the key slot 16 which is formed and is receptive of the key member 18 when the different parts 36 and 38 of the slot are aligned. Relative rotation of either the nut part 12 or the collar part 14 will result in misalignment of the slots 36 and 38 and make the key slot half of the width necessary for the key 18 to fit therein.

Changes in the configuration of either or both of the cooperative slots 36 and 38 will require a different key and one that is matched to the new key slot configuration which results. For example, a key ridge provided in the slot 36, as shown by the phantom line 44 in FIGURE 5, will require a key member with a complementary notch formed therein and extending the full length thereof.

Figure 6:
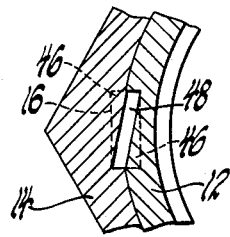
FIGURE 6 is similar to FIGURE 5 and shows a different key slot arrangement.

FIGURE 6 shows the originally described key slot 16 in dotted outline. However, the opposite corners 46 of the slot are filled so that the resulting new key slot, identified 48, extends diagonally between the slot parts in the nut and collar members 12 and 14. A key having a width comparable to the greatest depth of one of the slot parts is then required and it will not serve as a key in the first arrangement described nor will the key first described fit in the slot 48.

It follows that diamond and other irregular key slots and matching keys may be provided as desired.

Figure 7:
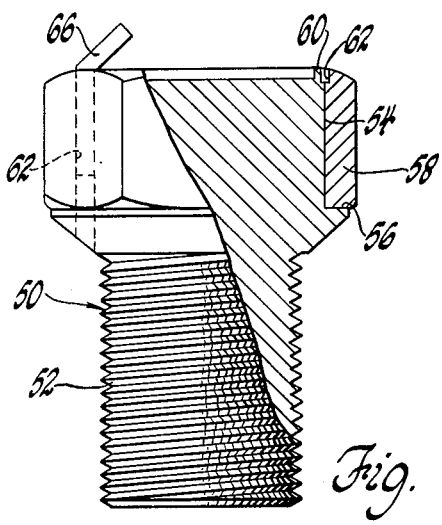
FIGURE 7 is a side view of a bolt fastener modified to include the features of this invention and having a part thereof broken away and shown in cross-section.

A tamper-proof bolt 50 is shown by FIGURE 7. It includes a stud with a threaded shank 52 and having a plane-surfaced cylindrical portion 54 which is separated from the threaded part by an annular shoulder 56. A hex-surfaced head or collar member 58 is provided on the plane-surfaced cylindrical end 54 and is retained thereto by rolling the upstanding ridge 60 into engagement with the shoulder ledge 62 provided on the collar member. This is substantially in the same manner as the collar member 14 is retained on the nut portion 12 for the tamper-proof nut fastener 10 previously described.

A key slot 62 is co-operatively formed down one side of the threaded shank 52 and in the collar member 58, also as before, and the key 66 is receptive in the slot to lock the two parts together.

Figure 8:
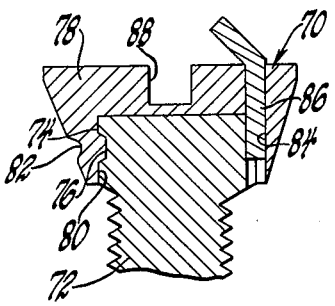
FIGURE 8 is a cross-sectional view of a screw fastener modified to include the features of this invention.

FIGURE 8 shows a screw fastener 70 which includes a threaded shank 72 including a plane-surfaced cylindrical part 74 at one end which is provided with an annular groove 76. A screw head shaped cap 78 is formed to include a bore 80 and to be received on the plane-surfaced end of the threaded shank. It is rolled or otherwise deformed, as at 82, circumferentially thereof into the groove 76 so that the two parts are retained in relatively rotatable engagement with each other. A key slot 84 is provided, as before, and a key 86 is receptive in the slot to lock the screw shaped cap member 78 to the threaded stud.

The screw head cap 78 includes a tool slot 88 receptive of the end of a screw driver and when the members are locked together the fastener may be driven in the usual manner.

It will be appreciated that the key slots 16, 62 and 84 are, in each instance, disposed free from any interference with other parts of the fastener and so that anything wedged in the slot may be forced clear through the slots without great difficulty, or scoring of the threads in the instance of the bolt and screw fasteners.

Without further discussion it should be obvious that numerous other variations, modifications and combinations are conceivable and are within the scope of this invention.

Although a preferred embodiment and several variations have been shown and described in detail, it will be appreciated that this has been done to illustrate the present invention and without intent to unnecessarily limit the invention in any regard.

Such improvements, modifications and alterations as come to mind and are within the spirit of this invention and are not specifically excluded by the language of the hereinafter appended claims are to be considered as inclusive thereunder.

I claim:
1. A tamper-proof fastener, comprising;
   a member having an outer cylindrical surface provided near one end thereof and including an annular shoulder provided thereon and means for forming a second annular shoulder in spaced relation thereto,
   a hexagonal surfaced collar member including a bore receptive of the surfaced end of said member therewithin and for rotatable engagement and positive location on said member between said shoulders,
   a key slot cooperatively formed in the respectively adjacent surfaces of said surfaced end and said collar member and extending through said shoulders and being open at both the top and underside thereof,
   said key slot being aligned with a corner of the hexagon of said collar member and including an abutment shoulder extending transversely of the bore in said collar member,
   the key slot in said surfaced end including an opposed abutment shoulder extending transversely of the axis thereof,
   a shear resistant key removably receptive in said key slot between said abutment shoulders for locking said members against relative rotation therebetween,
   and said key having an end thereof angularly disposed apart from the rest thereof and radially inwardly of said collar.

2. The tamper-proof fastener of claim 1,
   said first mentioned member including a nut internally threaded and having said collar member providing an operative exterior surface therefor as locked thereto.

3. The tamper-proof fastener of claim 1,
   said first mentioned member including a stud having a threaded shank and said surfaced end receptive of said collar member providing a bolt head end therefor.

(References on following page)

References Cited by the Examiner

UNITED STATES PATENTS

| | | | |
|---|---|---|---|
| 522,334 | 7/1894 | Zwigard et al. | 85—32 |
| 641,191 | 1/1900 | Champion | 85—32 |
| 1,486,448 | 3/1924 | Norlund | 85—32 |
| 1,516,453 | 11/1924 | Nichols | 85—32 |
| 1,609,645 | 12/1926 | Dewire | 85—9 |
| 2,372,269 | 3/1945 | Golan | 85—32 |

FOREIGN PATENTS

| | | |
|---|---|---|
| 660,630 | 4/1963 | Canada. |
| 170,803 | 11/1921 | Great Britain. |
| 325,581 | 1/1930 | Great Britain. |

EDWARD C. ALLEN, *Primary Examiner.*